United States Patent Office 2,750,960
Patented June 19, 1956

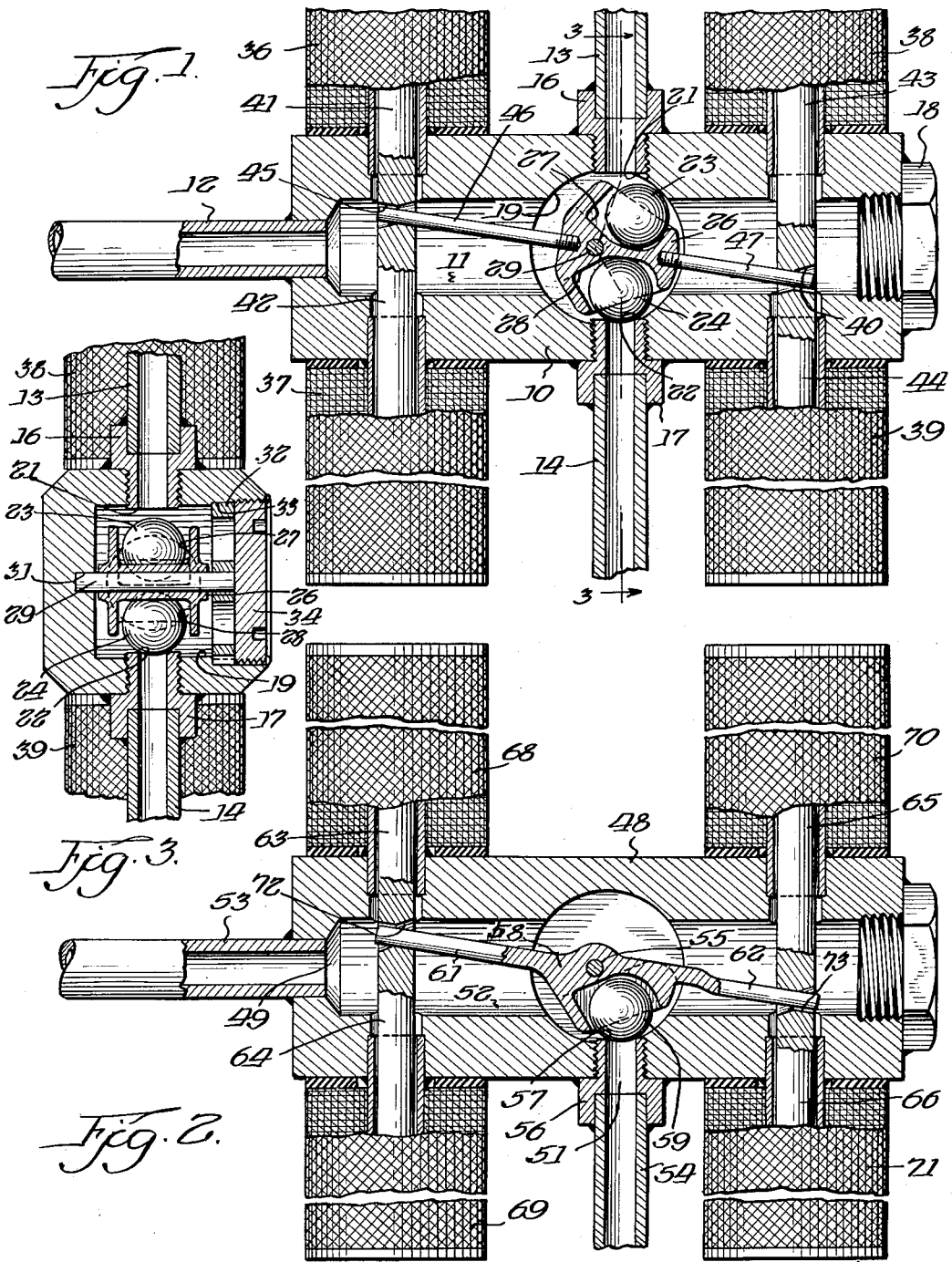

2,750,960

VALVE

George E. Hansen, Chicago, Frank D. Cotterman, La Grange, and Edmond P. De Craene, Westchester, Ill., assignors to Crane Co., Chicago, Ill., a corporation of Illinois Application April 11, 1951, Serial No. 220,372

4 Claims. (Cl. 137—609)

This invention relates to a novel valve construction and actuating means therefor. More particularly, it relates to a pivotal type of valve especially suitable for quick-opening operation on high pressure fluids.

It is an important object of this invention to provide a relatively economical and effective quick operating valve having means for seating under fluid pressure by a relatively simple actuating motion.

Another important object is to provide a valve operating means which eliminates the need for the usual valve packing boxes both externally and internally, and thereby minimizes objectionable friction normally affecting relatively easy valve operation.

Still another important object is to provide a valve which is constructed to permit easy fluid tight actuation of the valve closure member combined with simple and rapid operation by arcuately moving the closure member from open to closed position and vice versa within the peripheral limits of the valve chamber.

Another object of this invention is to provide a valve actuating mechanism which may be solenoid operated, for example, thereby eliminating the usual valve handwheel, the stem, yoke or bonnet and the like trimmings, and thus avoiding the usual expense and cumbersome parts encountered in the provision for operation of these elements.

Other objects and advantages of the structure will become more readily apparent upon proceeding with the following description read in light of the accompanying drawings, in which, Fig. 1 is a sectional assembly view through a preferred embodiment of this invention.

Fig. 2 is a sectional assembly view of a modification of this invention.

Fig. 3 is a fragmentary sectional view taken on the line 3—3 of Fig. 1.

Similar reference numerals refer to similar parts throughout the several views.

As shown in Fig. 1, this invention preferably comprises an elongated hollow valve body 10 which is shown to be of a thick wall section for withstanding relatively high internal fluid pressures and is provided with an axial opening 11. Preferably welded to the body to be fluid tightly attached thereto is a fluid inlet pipe 12 which communicates with the valve body opening 11. It should be noted that fluid outlet pipes 13 and 14 are respectively connected to fittings 16 and 17, which are preferably threadedly engaged in diametrically opposite openings in the valve body 10 to extend therewithin. The inner ends of fittings 16 and 17 extend within the valve body 10 to a central valve body chamber 19, where the annular end surfaces 21 and 22 of the respective fittings 16 and 17 form the valve seats, as shown. An end portion of the valve body 10 is enclosed by means of a threaded plug 18, which is received within the valve body opening 11 and is preferably welded to the body 10 to be fluid tight therewith. Thus, in accordance with the above described construction, a three-way valve is provided to be adaptable to this invention as hereinafter explained.

A spherical valve closure member or ball 23 is preferably freely disposed within the valve chamber 19 to be operable, under the influence of line fluid pressure, on the seat 21 and thereby close the valve outlet pipe 13 to interrupt fluid flow through the valve. It is obvious from the view of Fig. 1, a similar closure member 24 can be provided to operate on the valve seat 22 and interrupt fluid flow through the valve outlet pipe 14. For the purpose of effecting actuation of the closure members 23 and 24 from their respective seats in opening the valve under line fluid pressure, the closures are substantially larger than the respective diameters of the seats 21 and 22. Thus, the closures 23 and 24 when rolled off their respective valve seats 21 and 22 are easily actuated by a force applied substantially parallel to the initial direction of travel of the closures.

The actual preferred means of actuating the closures is the primary contribution of this invention and is, as shown in Fig. 1, preferred to comprise an actuator or cage member, generally designated 26, which partly encloses the closures 23 and 24 separately to guide the latter members within the central valve chamber 19 in the area of their respective valve seats. Thus, the closures 23 and 24 are partly received respectively within the pockets 27 and 28 of the cage member 26 which is rotatably mounted on a shaft 29 with the latter member extending transversely through the cage to have one end mounted in a valve body recess 31, as shown in Fig. 3, while the shaft opposite end is rotatably mounted in a spider member 32, which is fitted into a side opening 33 of the valve body 10. It should be understood, however, that this invention is not limited to the employment of a spherical closure member or members, as shown, as numerous conventional closure members could be employed. The body opening 33 is preferably sealed off by a means of a threaded plug 34 which retains the spider in position with the plug, preferably being welded to the body 10 to effect a fluid tight seal therewith.

The cage 26 is thereby mounted on the shaft 29 and by the above described means, and the cage either alternately positions or permits fluid pressure to alternately position the ball closures 23 and 24 with respect to their corresponding seats 21 and 22, depending upon the rotative position of the cage member. It should be apparent that the cage 26 will positively seat the closures with predetermined rotative movement of the cage. It should be obvious from the view shown in Fig. 1, that either one of the outlet pipes will necessarily be open at all times, but that construction is merely for display purposes, and is not intended to restrict the application of this invention.

The precise means of actuating closure members 23 and 24 is, as shown in Fig. 1 to comprise solenoid operation of the cage 26 which is provided with extension or actuating rods 46 and 47. Four solenoids 36, 37, 38, and 39 are preferably mounted in any conventional manner on the valve body 10 to be fluid tight therewith and having corresponding solenoid plungers or cores 41, 42, 43, and 44 mounted within the solenoids to project therefrom through the wall of the body 10 to within the valve body opening 11. It is preferred that a pair of solenoids, such as 36 and 37, be mounted directly opposite each other to position their plungers 41 and 42 in axial alignment, such that the plungers can be integrally formed or connected to act as a single plunger. Thus, plungers 41 and 42 comprise a unitary plunger having a central slot 45 provided therein to receive the rod 46 and thereby connect to the cage 26. A similar arrangement is provided for solenoids 38 and 39 while plungers 43 and 44 are combined having a central slot 40 for receiving rod 47.

It is thus preferred and arranged that two oppositely located solenoid cores, such as 41 and 42, are integrally formed and are alternately actuated axially as a single core by energizing the solenoids 36 and 37. The similar arrangement provided with solenoid cores 43 and 44 and solenoids 38 and 39 alternately actuate the cores 43 and 44 as a unitary core. Similar electrical winding should exist between solenoids 36 and 39 and solenoids 37 and 38 for the obvious reason of correlating valve operation. Thus, as shown in position in Fig. 1, solenoids 36 and 39 are presently energized, tending to center cores 41 and 44, respectively, and thereby actuating rods 46 and 47 to rotate cage 26 to the position permitting ball closure 24 to seat on outlet 21. It should be apparent that energization of cores 37 and 38 would produce a similar reaction with respect to cores 42 and 43, and thereby seat ball closure 23 on the outlet 22. It will be obvious that with the above described means of actuating a valve, a rapid and easy valve operation is achieved, while eliminating the usual sources of fluid leakage, such as stem packing, encountered in the customary valve constructions. Four solenoids are shown and described, but it should be understood that such arrangement is merely for better operation of the valve and not indispensible to this invention as a lesser number could be employed, and also, it should be obvious that other power supplies, such as hydraulic or pneumatic cylinders and plungers, could be employed to effect the actuation herein desired.

As shown in Fig. 2, a modification of the invention described in connection with Fig. 1 consists of substantially the same actuating arrangement, while eliminating one of the valve outlets and thereby adopting this inventive concept to a two-way valve. Thus, the valve body 48 consists of an inlet opening 49 with a single outlet opening 51 and an intermediate chamber 52. Similarly, as described above, inlet pipe 53 and outlet pipe 54 are respectively connected to the body in the openings 49 and 51 with the further provision of a fitting member 56 preferably provided in the outlet opening 51 to extend through the wall of the body 48. Again, the inner end surface 57 of the fitting member 56 serves as the valve seat. Mounted substantially centrally on a shaft 55 within the valve chamber 52 to be pivotal therewithin, is a cage or actuator member 58 which positions a spherical closure 59 with respect to the valve seat 57 to thereby selectively interrupt fluid flow through the valve. Extending lever portions 61 and 62 of actuator 58 engage slots 72 and 73 provided in solenoid cores 63, 64, 65, and 66, which extend from solenoids 68, 69, 70, and 71 in an arrangement similar to that described in connection with Fig. 1. It should thus be apparent that operation of the valve shown in Fig. 2 is similar to that previously described, with the exception of a single closure member being positioned with respect to a single valve outlet. Thus, energizing solenoids 68 and 71 attract plungers 63 and 66 to rotate the actuator member 58 and thereby operate the closure 59 to close the valve as shown in Fig. 2. Energizing solenoids 69 and 70 will, of course, open the valve.

To further emphasize the advantages of the invention herein described, it will be noted that this construction is desirable for operation on high pressure fluids where a relatively large valve unseating force is required to open the valve. The employment of four solenoids provides for this large force while maintaining a relatively compact structure by not extending the valve actuator projection which engages the operating means and thereby overcomes the inherent power limitation of the conventional solenoids. Also, it will be apparent that a hammer-blow can be applied by the solenoid plunger to the valve actuator and thereby further aid in operating the valve. Further, no springs or other aids are required to operate the valve as is usually done in closing solenoid operated valves with the result of a loss in the operating effectiveness of the solenoid working against a spring effort.

Although this invention has been described in specific forms, it is susceptible to numerous changes and, should, therefore, be limited only by the spirit of this application and the scope of the appended claims.

We claim:

1. In a valve construction or the like comprising a substantially fluid tight casing having a fluid inlet and a plurality of outlet openings, a shaft extending into the said casing, a closure member holder between said inlet and outlet openings rotatably movable on the shaft within the said casing and having oppositely disposed actuating rods extending therefrom, spherical closure means within said holder member and limitedly restricted in movement by the said closure member holder within a recessed portion on substantially oppositely disposed sides thereof thereby to selectively interrupt fluid flow through the said valve by seating of the said closure means in one of the outlet openings of the casing under line-fluid pressure upon predetermined rotative movement of the said holder, the side walls of the said recessed portion at opposite sides of the said spherical closure means contacting the said spherical closure means to move the latter member in opposite directions, the said shaft journally supporting the said holder and extending in a plane substantially at right angles to the said actuating rods, and apertured rod means reciprocally movable and with the apertures oppositely disposed in different planes within the casing to actuate the said holder rods.

2. In a valve construction or the like comprising a substantially fluid tight casing having a fluid inlet and a plurality of outlet openings, a shaft extending into the said casing, a closure member holder between said fluid inlet and outlet openings rotatably movable on the said shaft within the said casing and having oppositely disposed actuating rods extending therefrom, oppositely disposed spherical closure means within said holder member and limitedly restricted in movement by the said closure member holder within a pocket portion thereof thereby to selectively interrupt fluid flow through the said valve by seating said closure means in one of the outlet openings of the casing under line-fluid pressure upon predetermined rotative movement of the said holder, the side walls of the said pocket portion at opposite sides of the said spherical closure means contacting the said spherical closure means to move the latter member in opposite directions, the said shaft journally supporting the said holder and extending in a plane substantially at right angles to the said actuating rods, oppositely disposed shaft means reciprocably movable to actuate said rods, the said shaft means having apertures in different planes engaging end portions of the said actuating rods whereby upon predetermined reciprocating movement of the said latter shaft means the said holder member is rotated to move said spherical closure means from a position closing one of the outlet openings to a position allowing for predetermined fluid flow therepast.

3. In a valve construction or the like comprising a substantially fluid tight casing having a fluid inlet and a plurality of outlet openings, a shaft extending into the said casing, a closure member holder between said inlet and outlet openings rotatably movable on the said shaft within a substantially cylindrical chamber of the said casing and having oppositely disposed actuating rods extending therefrom, oppositely disposed spherical closure means disposed in a hollow portion of said holder member and limitedly restricted in movement therewithin upon predetermined rotation of said holder to selectively interrupt fluid flow through the said valve by seating said closure means in one of the outlet openings of the casing under line-fluid pressure upon predetermined rotative movement of the said holder, the side walls of the said hollow portions at opposite sides of said spherical closure means contacting each of the said spherical closure means to move the latter members in opposite directions, the said shaft journally supporting the said holder and extending in a plane substantially parallel to the central axis of the cylindrical chamber of the casing, means reciprocably movable engaging the said rods in different planes, the said latter actuating means being positioned at end portions of the casing to provide a transversely extending valve chamber communicating therewith and positioned therebetween.

4. In a valve construction or the like comprising a substantially fluid tight casing having a fluid inlet and a plurality of outlet openings, a shaft extending into the said casing, a closure member holder between said inlet and outlet openings rotatably movable on the said shaft within the said casing and having oppositely disposed actuating rods extending therefrom, oppositely disposed spherical closure means within said holder member and limitedly restricted in movement by the said closure member holder within recessed portions thereof thereby to selectively interrupt fluid flow through the said valve by seating said closure means in one of the outlet openings of the casing under line-fluid pressure upon predetermined rotative movement of the said holder, the side walls of said recessed portions at opposite sides of the said spherical closure means contacting the said closure means to move the latter member in opposite directions, the said shaft journally supporting the said holder and extending in a plan substantially at right angles to the said actuating rods, means reciprocably movable to pivotally actuate the said rods on the holder, the latter reciprocably movable means being guided at opposite limits of the said casing and having apertured portions in different planes of substantially intersecting frusto-conical form for engagement by the said rods, and means cooperating with said reciprocably movable means to move the latter members and rotate the said holder within the casing.

References Cited in the file of this patent

UNITED STATES PATENTS

| | | |
|---|---|---|
| 1,622,723 | Johnson | Mar. 29, 1927 |
| 1,755,057 | Fagan | Apr. 15, 1930 |
| 2,348,827 | Lambert | May 16, 1944 |
| 2,353,535 | Young | July 11, 1944 |
| 2,650,059 | Hjulian | Aug. 25, 1953 |

FOREIGN PATENTS

| | | |
|---|---|---|
| 3,697 | Great Britain | of 1910 |
| 576,459 | France | Aug. 21, 1924 |